United States Patent
Riedel

[11] 3,787,005
[45] Jan. 22, 1974

[54] MEANS FOR TRANSPORTING MOTION PICTURE FILM OR THE LIKE

[75] Inventor: Wolfgang Riedel, Winnenden, Germany

[73] Assignee: Robert Bosch Photokino GmbH, Stuttgart, Germany

[22] Filed: Mar. 31, 1972

[21] Appl. No.: 240,254

[30] Foreign Application Priority Data
Apr. 1, 1971 Germany............................ 2115873
Nov. 3, 1971 Germany............................ 2154546

[52] U.S. Cl. ................................. 242/205, 74/705
[51] Int. Cl. ........................ B11b 15/32, G03b 1/04
[58] Field of Search ........................... 242/201–205; 74/681, 682, 705; 352/174–179

[56] References Cited
UNITED STATES PATENTS
1,243,739  10/1917  Howell............................... 242/205
3,498,571  3/1970  Dilling et al. ....................... 242/203

*Primary Examiner*—Leonard D. Christian
*Attorney, Agent, or Firm*—Michael S. Striker

[57] ABSTRACT

The supply reel of a cinematographic apparatus is driven by the internal gear of a planetary transmission whose sun gear receives torque from an electric motor. The cage for the planet pinions can be coupled to the internal gear so that the latter rotates with the sun gear at a high speed in a direction to collect the film on the reel. When the cage is disengaged from the internal gear, it is held against rotation by a stationary stop so that the internal gear rotates the reel at a lower speed and in a direction to pay out the film. The cage can be further coupled to an elastic clamping device which is in frictional engagement with the internal gear so that the clamping device can slip with reference to the internal gear when the film offers a relatively low resistance to transport in a direction to be collected by the reel.

19 Claims, 5 Drawing Figures

PATENTED JAN 22 1974 3,787,005.

MEANS FOR TRANSPORTING MOTION PICTURE FILM OR THE LIKE

BACKGROUND OF THE INVENTION

The present invention relates to improvements in cinematographic or like apparatus wherein a web of motion picture film, magnetic tape or a like strip-shaped carrier of information is transported lengthwise between a supply reel and a takeup reel. More particularly, the invention relates to improvements in a mechanism for transporting webs or strips of motion picture film or the like at several speeds and/or in different directions. For example, the mechanism of the present invention can be utilized for transport of film between the supply and takeup reels in a motion picture projector wherein the film must be transported in a first direction and at a first speed during the projection of images of successive film frames and wherein the film must be transported at a higher second speed in a second direction for rapid rewinding onto the core of the supply reel.

In presently known cinematographic or like apparatus, the mechanism which effects the forward and rearward transport of motion picture film or the like normally employs a reversible motor or a transmission which is designed to transport the film forwardly at one or more speeds and rearwardly at a high speed to insure rapid rewinding of film onto the supply reel. Such transmissions are invariably complex, expensive, bulky and often prone to malfunction.

SUMMARY OF THE INVENTION

An object of the invention is to provide a novel and improved mechanism which can be installed between a prime mover and a reel which serves for storage of motion picture film, magnetic tape or analogous web- or strip-shaped material and which is not only simpler and less expensive but also more compact and more rugged than heretofore known mechanisms.

Another object of the invention is to provide a mechanism which does not necessitate the use of a reversible prime mover but is still capable of changing the direction and speed of transport of film or like web-like material.

A further object of the invention is to provide a novel and improved transmission which can be utilized to transmit motion between the prime mover and a film collecting or dispensing reel in a cinematographic apparatus or the like.

An additional object of the invention is to provide a transmission which is capable of rapidly changing the direction and/or speed of transport of web- or strip-shaped material and which can employ relatively inexpensive and lightweight components without unduly affecting its operation and/or useful life.

The invention is embodied in an apparatus for recording and/or reproducing intelligence on band-like carriers, particularly in a cinematographic apparatus. The apparatus comprises a planetary transmission including coaxial sun and internal gears, a rotary cage which is coaxial with the two gears and at least one planet pinion which is rotatably mounted on the cage and meshes with the two gears. The apparatus further comprises drive means for rotating one of the gears in a predetermined direction, coupling means provided on the cage and being movable relative to the cage between a plurality of positions including a first position in which the cage is connected for rotation with at least one of the gears and a second position, stop means for holding the coupling means and the cage against rotation in the second position of the coupling means, a reel or an analogous rotary carrier-collecting member, and means for rotating the carrier-collecting member in response to rotation of the gears.

The coupling means may comprise a leaf spring which is flexible between its positions. Such leaf spring may comprise a first end portion which is rigid with the cage (i.e., the leaf spring may be fixedly secured to or it may form an integral part of the cage) and a second end portion which includes a projection. The stop means is then located in the path of movement of such projection about the axis of the gears in the second position of the coupling means. One of the gears includes entraining means which engages the projection to rotate with the cage in the first position of the coupling means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
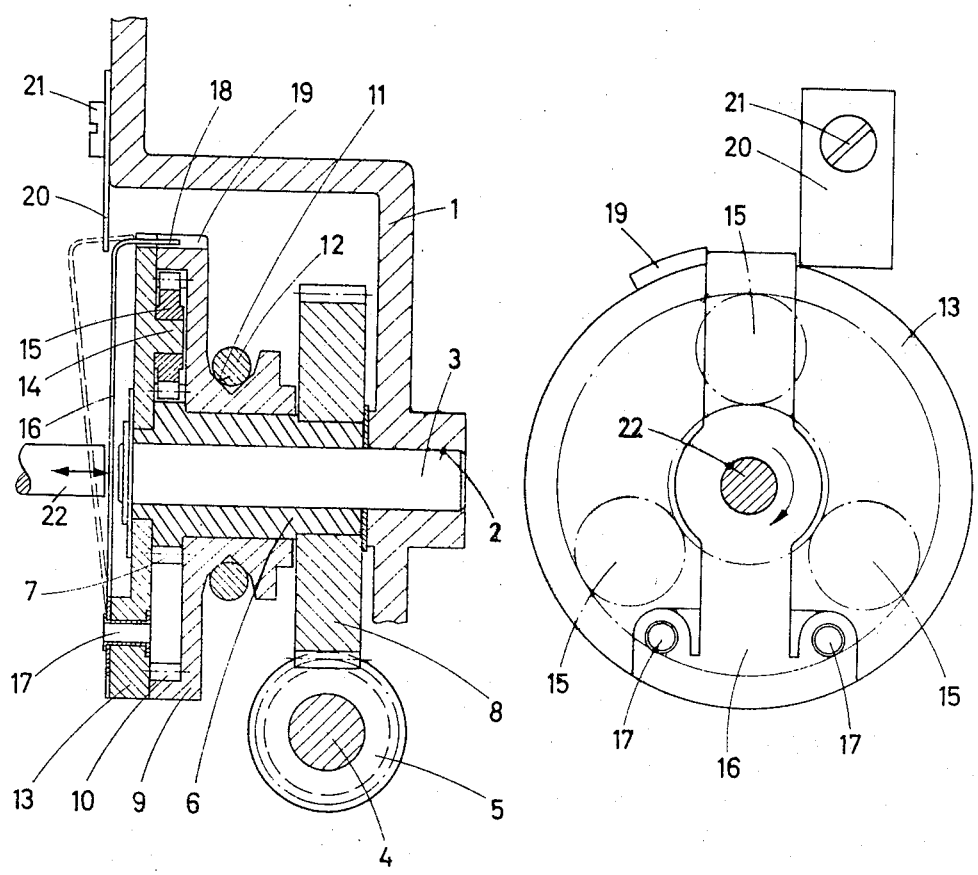
FIG. 1 is a fragmentary vertical sectional view of a cinematographic apparatus wherein one of the reels is driven by a planetary transmission which is constructed and assembled in accordance with a first embodiment of the invention.
FIG. 2 is a side elevational view as seen from the left-hand side of FIG. 1.

Referring first to FIGS. 1 and 2, there is shown a portion of a cinematographic apparatus which comprises a housing or body 1 having a bore 2 for a shaft 3 which rotatably supports a sun gear 7 forming part of a planetary transmission. A sleeve 6 of the sun gear 7 is driven by the output shaft 4 of a prime mover (such as an electric motor) through the intermediary of a step-down transmission including a worm 5 on the shaft 4 and a worm wheel 8 on the sleeve 6. The worm wheel 8 is non-rotatably secured to the sleeve 6. In the embodiment of FIGS. 1 and 2, the teeth of the sun gear 7 are integral with the left-hand end portion of the sleeve 6.

The sleeve 6 of the sun gear 7 further serves as a bearing for the hub of an internal gear 9 which also forms part of the planetary transmission and has an annulus of teeth 10 mating with the teeth of three equidistant planet pinions 15. These pinions further mesh with the teeth of the sun gear 7 and are rotatable on stub shafts 14 forming part of a disk- or plate-like cage 13 which is mounted on a smaller-diameter portion of the sleeve 6 in front of the teeth of the sun gear 7.

The hub of the internal gear 9 constitutes or is rigidly connected with a pulley or sheave 11 for an endless flexible element 12 which drives a supply reel R (see FIG. 5) of the cinematographic apparatus. A coupling element 16, here shown as a leaf spring, is secured to the cage 13 by means of rivets 17 or analogous fasteners.

The coupling element 16 can assume either one of two different positions which are respectively indicated by solid and broken lines. Its free end is provided with a bent-over projection or claw 18 which is moved into the path of an external entraining projection 19 on the internal gear 9 when the coupling element 16 assumes the solid-line position. In the broken-line position of the coupling element 16, its claw 18 can be engaged by a stationary stop 20 which is secured to the housing 1 by means of one or more screws 21 or similar fasteners. The coupling element 16 tends to assume its broken-line position, i.e., it is necessary to flex this coupling element in order to move the claw 18 into the path of the projection 19 on the internal gear 9. To this end, the cinematographic apparatus comprises actuating means or shifter means 22 which can assume the form of a reciprocable pushbutton or the form of a rotary cam. It is assumed that the actuating means 22 is a pushbutton which normally tends to assume an extended position so as to allow the coupling element 16 to dwell in the broken-line position of FIG. 1. When the pushbutton 22 is depressed, e.g., against the opposition of a helical spring or analogous biasing means, the coupling element 16 is flexed to assume the solid-line position of FIG. 1 and to thereby move its claw 18 into the path of movement of the projection 19. The biasing means for the pushbutton 22 can be omitted if the bias of the coupling element 16 suffices to normally maintain the pushbutton 22 in its extended or inoperative position.

The internal gear 9 can be provided with two or more angularly spaced projections 19.

The operation:

When the planetary transmissions is to rotate the reel R in a direction to collect the film, the coupling element 18 is allowed to assume its unstressed position which is shown by broken lines. When the prime mover is started to rotate its output shaft 4 and to thereby rotate the sleeve 6 of the sun gear 7 by way of the step-down transmission 5, 8, the sun gear 7 rotates the planet pinions 15 which in turn rotate the internal gear 9 at a speed less than the speed of the sleeve 6. The ratio of the speeds of gears 7, 9 is a function of the ratio of the numbers teeth on these gears. The claw 18 of the coupling element 16 is held by the stationary stop 20 so that the cage 13 is held against rotation with the sleeve 6 and the planet pinions 15 are compelled to rotate in response to rotation of the sun gear 7. The sheave 11 of the internal gear 9 drives the flexible element 12 which rotates the reel R at a normal speed which is desirable for satisfactory transport of the film in forward direction.

In order to rapidly rewind the film, the reel R must be rotated at a high speed in a direction to collect out the film. This is achieved by depressing the pushbutton 22 so that it disengages the claw 18 from the stationary stop 20 and moves it into the path of the projection 19 on the internal gear 9. The gear 9 is then directly coupled with the sun gear 7 by way of the cage 13 which shares the angular movement of the sleeve 6 and hence of the sun gear 7. The direction of rotation of the internal gear 9 and sheave 11 is reversed and these parts rotate at a higher second speed, namely, at the speed of the sleeve 6 of the sun gear 7. The planet pinions 15 do not rotate on their shafts 14. During rapid rewinding of film, the parts 6, 7, 8, 9, 11, 13 and 16 rotate as a unit relative to the shaft 3, i.e., the step-down transmission including the parts 5, 8 must only overcome friction between the shaft 3 and sleeve 6. This contributes to a reduction of losses due to friction and enhances the stability of the planetary transmission due to a satisfactory ratio of the axial length to internal diameter of the sleeve 6.

FIG. 2 shows that the plane of the coupling element 16 intersects the common axis of the gears 7, 9 and the cage 13. Therefore, and since the pushbutton 22 is preferably mounted for movement in the axial direction of the shaft 3, the friction between the pushbutton and the coupling element 16 is very small when the claw 18 extends into the path of movement of the projection 19 on the internal gear 9.

The cage 13 may resemble a disk or plate which overlaps at least the major part of the space surrounded by the teeth 10 of the internal gear 9.

Figures 3, 4:
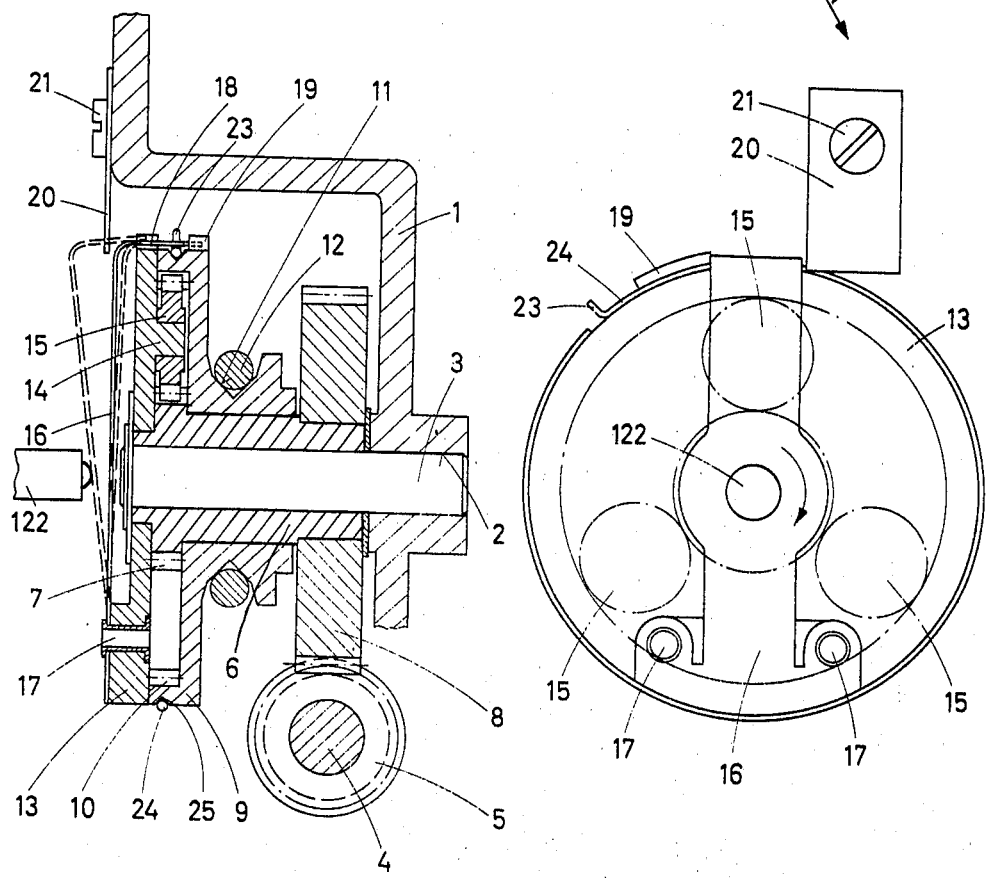
FIG. 3 is a fragmentary vertical sectional view of a second apparatus which employs a modified planetary tansmission.
FIG. 4 is a side elevational view as seen from the left-hand side of FIG. 3.

Referring to FIGS. 3 and 4, there is shown a portion of a modified apparatus wherein all such parts which are identical with or clearly analogous to the corresponding parts of the first apparatus are denoted by similar reference characters. The main difference is that the coupling element 16 can be moved to either one of three different positions including a broken-line position corresponding to the solid-line position of FIG. 1, a phantom-line position corresponding to the broken-line position of FIG. 1, and a solid-line position in which the claw 18 moves into the path of an outwardly bent end portion or lug 23 provided on an elastic clamping device 24 which is a split ring received in a circumferential groove 25 machined into the periphery of the internal gear 9. Thus, when held in the broken-line position of FIG. 3, the coupling element 16 moves its claw 18 into the path of movement of the projection 19 on the internal gear 9. When allowed to assume the phantom-line position of FIG. 3, the coupling element 16 causes its claw 18 to engage the stationary stop 20 so that the cage 13 of the planetary transmission is held against rotation with the gear 7 and/or 9. When caused or allowed to assume the solid-line position of FIG. 3, the coupling element 16 maintains its claw 18 in the path of movement of the lug 23 on the clamping device 24. The actuating means for effecting the movements of coupling elements 16 between its three positions preferably comprises a rotary cam 122 which can be moved between three different angular positions to thereby cause or allow the coupling element 16 to assume the corresponding one of the three positions shown in FIG. 3. The arrangement may be such that the coupling element 16 tends to assume its phantom-line position and must be flexed to a first extent in order to move to the solid-line position and to a greater second extent in order to move to the broken line position of FIG. 3. The clamping device 24 is placed into the groove 25 in stressed condition so that it is maintained in frictional engagement with the periphery of the internal gear 9.

Figure 5:
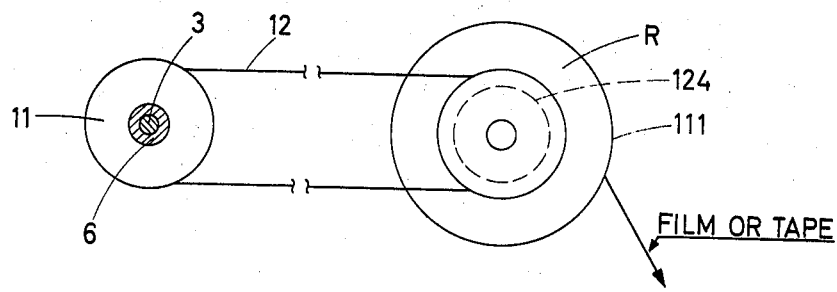
FIG. 5 is a diagrammatic view of the connection between the internal gear of the transmission and a reel for motion picture film or analogous web- or strip-shaped material.

The operation of the structure shown in FIGS. 3 and 4 is as follows:

When the reel R of FIG. 5 is to be driven in a direction to collect the film during normal operation of the apparatus, the actuating means 122 allows the coupling element 16 to assume the phantom-line position of FIG. 3 so that the cage 13 is held against rotation by the stop 20 and the internal gear 9 rotates at a speed which is less than the speed of the sun gear 7 and in the opposite direction. The planet pinions 15 rotate on their respective stub shafts 14 because the cage 13 is at a standstill.

In order to rapidly rewind the film onto the reel R, the user of the apparatus causes the coupling element 16 to assume the broken-line position of FIG. 3 so that the claw 18 engages with the projection 19 of the internal gear 9. The gears 7 and 9 rotate at the same speed and in the same direction which constitutes a reversal in the direction of rotation of the sheave 11 and in a rotation of this sheave at a higher speed. The planet pinions 15 do not rotate on their stub shafts 14 and the cage 13 rotates with the gears 7 and 9.

When the user causes the actuating means 122 to effect a movement of the coupling element 16 to the solid-line position of FIG. 3, the claw 18 is moved into engagement with the lug 23 of the prestressed clamping device 24. Consequently, the cage 13 rotates with the internal gear 9 due to friction which exists between the periphery of the internal gear and the clamping device 24. The friction between the clamping device 24 and the internal gear 9 is preferably less than the friction between the reel R and the sheave 111 which is driven by the endless flexible element 12. The friction between the reel R and the sheave 111 is generated by a friction clutch 124. Thus, when the tension of the film increases only slightly, the clamping device 24 begins to slip with reference to the internal gear 9 and the rapid transport of film is interrupted.

It will be seen that a single coupling element (16) renders it possible to utilize the planetary transmission of FIGS. 3 and 4 for three different operations, namely, a forward transport of the film at a relatively low speed (phantom-line position of the coupling element 16), a rearward transport of the film at a relatively high speed with rigid connection between the cage 13 and the internal gear 9 (broken-line position of the coupling element 16), and a rearward transport of the film at a relatively high speed with mere frictional engagement between the cage 13 and the internal gear 9 (solid-line position of the coupling element 16).

At least some component parts of the improved planetary transmission may consist of synthetic plastic material with attendant reduction in weight and cost. Also, the coupling element 16 (which can consist of metallic or synthetic plastic material) may form an integral part of the cage 13. This element need not necessarily be elastic, depending on the nature of its connection or cooperation with the actuating means 22 or 122. Furthermore, the cage 13 can support one, two, four or more planet pinions. The stop 20 can be provided with an aperture or recess which receives the claw 18 when the coupling element 16 assumes the broken-line position of FIG. 1 or the phantom-line position of FIG. 3.

The purpose of the friction clutch including the clamping device 24 will be more readily understood by bearing in mind that, during certain stages of operation of a motion picture projector, it is desirable to interrupt the torque transmitting connection between the supply reel for motion picture film and the prime mover in response to relatively slight tensioning of the film. Thus, when the film is to be rapidly rewound onto the reel R, the claw 18 of the coupling element 16 will engage the projection 19 of the internal gear 9 so that the film will be collected by the reel R as long as the friction clutch 124 transmits torque between the sheave 111 and the reel R. This insures that the film which is coiled onto the core of the reel R forms a series of closely adjacent convolutions. However, when the reel R is to be rotated during automatic attachment of the leader of film to its core, for example by means of a catcher, the coupling element 16 dwells in the solid-line position of FIG. 3 so that the connection between the output shaft 4 and the reel R can be interrupted as soon as the peripheral surface of the internal gear 9 begins to slip with reference to the clamping deivce 24. The friction between the parts 9, 24 is less pronounced than between the parts 111, R or 124, R so that the internal gear 9 will begin to slip in response to relatively slight tensioning of film. Otherwise, the catcher would tear the leader of the film as soon as its tooth would enter a perforation.

It is clear that the clutches 24 and 124 could be replaced by a different clutch which could be adjusted to transmit a greater or lesser torque. It was found, however, that the construction shown in FIGS. 3-5 is particularly suitable for use in cinematographic or like apparatus because the actuating means (122) which is used to change the direction of rotation of the reel R can also serve as a means for activating or deactivating the clutch 24 by the simple expedient of moving the coupling element 16 to or from the solid-line position of FIG. 3. In other words, it is not necessary to provide a separate rotary and/or reciprocable means for changing the condition of a single friction clutch or for engaging or disengaging a discrete clutch whenever the transport of film is to be interrupted in response to relatively slight resistance to such transport.

The groove 25 in the peripheral surface of the internal gear 9 insures that the clamping device 24 remains in the desired axial position irrespective of whether it rotates with or relative to the gear 9.

It is also within the scope of the invention to connect the coupling element 16 with the sun gear 7 and/or its sleeve 6. The sun gear 7 then rotates the cage 13 and the pinions 15 cannot rotate on the respective shafts 14. Therefore, the internal gear 9 rotates with the sun gear. When the coupling element 16 is thereupon connected with the internal gear 9, the sun gear 7 tends to rotate the planet pinions 15. Such rotation of pinions 15 would cause a relative angular movement between the cage 13 and internal gear 9. This is prevented by the coupling element 16 so that the gears 7, 9 rotate at the same speed.

Without further analysis, the foregoing will so fully reveal the gist of the present invention that others can, by applying current knowledge, readily adapt it for various applications without omitting features which fairly constitute essential characteristics of the generic and specific aspects of my contribution to the art, and, therefore, such adaptations should and are intended to be comprehended within the meaning and range of equivalence of the claims.

What is claimed as new and desired to be protected by Letters Patent is set forth in the appended

1. In an apparatus for recording and/or reproducing intelligence on band-like carriers, particularly in a cinematographic apparatus, a combination comprising a planetary transmission including coaxial sun and internal gears, a rotary cage coaxial with said gears and at least one planet pinion rotatably mounted on said cage and meshing with said gears; drive means for rotating one of said gears in a predetermined direction; coupling means provided on said cage and movable relative thereto between a plurality of positions including a first position in which said cage is connected for rotation with at least one of said gears and a second position; stop means for holding said coupling means and said cage against rotation in said second position of said coupling means; a rotary carrier-collecting member; and means for rotating said member in response to rotation of said gears.

2. A combination as defined in claim 1, wherein said coupling means is a leaf spring which is flexible between said plurality of positions.

3. A combination as defined in claim 2, wherein said leaf spring comprises a first end portion rigid with said cage and a second end portion including a projection, said stop means being located in the path of movement of said projection about the axis of said gears in the second position of said coupling means and one of said gears including entraining means which engages said projection to rotate with said cage in the first position of said coupling means.

4. A combination as defined in claim 3, wherein said projection is a bent-over claw of said leaf spring.

5. A combination as defined in claim 1, wherein said coupling means is located in a plane which intersects the axis of said gears and further comprising actuating means arranged to engage with said coupling means in the region of said axis to effect movements of said coupling means between positions.

6. A combination as defined in claim 1, wherein said coupling means is integral with said cage, said cage and said coupling means consisting of elastomeric synthetic plastic material.

7. A combination as defined in claim 1, further comprising a shaft for said planet pinion, said shaft being integral with said cage.

8. A combination as defined in claim 1, wherein said sun gear comprises bearing means rotatably supporting said cage, said cage comprising a substantially disk-shaped member which overlaps at least a substantial portion of the space within said internal gear.

9. A combination as defined in claim 1, wherein said means for rotating said carrier-collecting comprises a sheave rigid with said internal gear, said sun gear comprising a portion rotatably supporting said sheave.

10. A combination as defined in claim 1, wherein said internal gear has a peripheral surface provided with at least one projection which is engaged by said coupling means in the first position of said coupling means so that the latter then connects said cage for rotation with said internal gear.

11. A combination as defined in claim 10, wherein said coupling means comprises a projection which overlies said peripheral surface and engages said projection of said internal gear in said first position of said coupling means.

12. A combination as defined in claim 1, wherein said coupling means is further movable to a third position, and further comprising a friction clutch engaging with one of said gears, said coupling means being arranged to connect said cage with said friction clutch means in said third position thereof.

13. A combination as defined in claim 12, wherein said internal gear has a peripheral surface and said friction clutch means comprises a clamping device in frictional engagement with said peripheral surface.

14. A combination, as defined in claim 13, wherein said clamping device comprises a projection which engages a portion of said coupling means in said third position of said coupling means.

15. A combination as defined in claim 14, wherein said clamping device is a split ring consisting of elastomeric material and having an outwardly bent end portion which constitutes said projection.

16. A combination as defined in claim 13, wherein said peripheral surface is provided with a groove for said clamping device.

17. A combination as defined in claim 1, wherein said cage is arranged to rotate with said sun gear in said first position of said coupling means and the latter is arranged to couple said internal gear to said sun gear by way of said cage in such first position of said coupling means, said drive means being arranged to rotate said sun gear and said means for rotating said carrier-collecting member receiving torque from said internal gear.

18. A combination as defined in claim 17, wherein said means for rotating said carrier-collecting member comprises a friction clutch.

19. A combination as defined in claim 17, wherein said drive means comprises a rotary output member and a step-down transmission between said sun gear and said output member.

* * * * *